United States Patent
Buttet et al.

(10) Patent No.: US 12,202,773 B2
(45) Date of Patent: Jan. 21, 2025

(54) COLORED COMPOSITE MATERIAL

(71) Applicant: HUBLOT SA, GENÈVE, Geneva (CH)

(72) Inventors: Mathias Buttet, Monnaz (CH); Luca Bianco, Lausanne (CH); Sébastien Recalcati, Lausanne (CH)

(73) Assignee: HUBLOT SA, GENÈVE, Geneva (CH)

( * ) Notice: Subject to any disclaimer, the term of this patent is extended or adjusted under 35 U.S.C. 154(b) by 0 days.

(21) Appl. No.: 16/496,754

(22) PCT Filed: Mar. 21, 2018

(86) PCT No.: PCT/EP2018/057208
§ 371 (c)(1),
(2) Date: Sep. 23, 2019

(87) PCT Pub. No.: WO2018/172428
PCT Pub. Date: Sep. 27, 2018

(65) Prior Publication Data
US 2020/0031719 A1    Jan. 30, 2020

(30) Foreign Application Priority Data
Mar. 22, 2017   (CH) .................... 00370/17

(51) Int. Cl.
*C04B 35/01*   (2006.01)
*C04B 35/645*   (2006.01)
(Continued)

(52) U.S. Cl.
CPC ............ *C04B 35/01* (2013.01); *C04B 35/645* (2013.01); *C09C 1/0012* (2013.01);
(Continued)

(58) Field of Classification Search
None
See application file for complete search history.

(56) References Cited

U.S. PATENT DOCUMENTS

2008/0026207 A1* 1/2008 Fink-Petri ................ C09C 1/66
264/603
2013/0089707 A1* 4/2013 Faure ....................... C09C 3/10
428/144
(Continued)

FOREIGN PATENT DOCUMENTS

EP    0455933 B1    6/1994
EP    0830429 B1    4/1999
(Continued)

OTHER PUBLICATIONS

International Search Report related to Application No. PCT/EP2018/057208 reported on Apr. 26, 2018.
(Continued)

*Primary Examiner* — Ronak C Patel
(74) *Attorney, Agent, or Firm* — von Briesen & Roper, s.c.

(57) ABSTRACT

A solid composite material combining:
an inorganic pigment in the form of discrete particles each comprising a colored core and a coating adapted to allow light to pass through
and a matrix based on metalloid or metal oxide, said matrix being adapted to allow light to pass through.

2 Claims, 2 Drawing Sheets

(51) Int. Cl.
*C09C 1/00* (2006.01)
*C09C 1/04* (2006.01)
*C09C 1/24* (2006.01)
*C09C 1/30* (2006.01)
*C09C 1/34* (2006.01)
*C09C 1/36* (2006.01)
*C09C 1/40* (2006.01)
*C09C 1/62* (2006.01)
*C09C 1/64* (2006.01)
*C09C 3/06* (2006.01)
*C04B 111/80* (2006.01)

(52) U.S. Cl.
CPC ............ *C09C 1/0015* (2013.01); *C09C 1/043* (2013.01); *C09C 1/24* (2013.01); *C09C 1/3045* (2013.01); *C09C 1/346* (2013.01); *C09C 1/3661* (2013.01); *C09C 1/405* (2013.01); *C09C 1/407* (2013.01); *C09C 1/625* (2013.01); *C09C 1/627* (2013.01); *C09C 1/642* (2013.01); *C09C 3/063* (2013.01); *C04B 2111/805* (2013.01); *C04B 2235/5418* (2013.01)

(56) References Cited

U.S. PATENT DOCUMENTS

2015/0291778 A1* 10/2015 Musick .................. C09C 3/063
  524/407
2016/0085169 A1* 3/2016 Hirai ...................... G03G 9/092
  430/107.1
2018/0327318 A1 11/2018 Buttet

FOREIGN PATENT DOCUMENTS

| JP | 2008031039 A | 2/2008 |
| JP | 2018508446 A | 3/2018 |
| WO | WO 2016/113422 A1 | 7/2016 |

OTHER PUBLICATIONS

Japanese Notice of Reasons for Rejection related to Application No. 2019-552457; reported on Jan. 4, 2022.

* cited by examiner

COLORED COMPOSITE MATERIAL

CROSS-REFERENCE TO RELATED APPLICATION

This Application is a 35 USC § 371 US National Stage filing of International Application No. PCT/EP2018/057208 filed on Mar. 21, 2018 and claims priority under the Paris Convention to Swiss Patent Application No. 00370/17 filed on Mar. 22, 2017.

FIELD OF THE DISCLOSURE

The present invention relates to colored composite materials, particularly ceramics (including ceramic-colored ceramic composites), their production method, and their uses.

BACKGROUND OF THE DISCLOSURE

Color ceramics produced industrially are generally aluminum oxides (alumina) or zirconium oxides loaded and mixed with a pigment. A pigment is a colorant that is insoluble in the medium that it colors. In particular, pigments are used to color a material throughout.

In some cases, the oxides may also be colored directly by the creation of defects, such as different atoms, in the crystal structure.

The production of colored ceramic components is well understood for some colors such as black, white, blue, and green, but not for all colors.

For example, despite all efforts, it has never been possible to produce a ceramic that is bright red. There are only variants of red/orange or red/brown ceramics.

Indeed, the usual method for producing colored ceramics consists of mixing the powdered ceramic with an inorganic pigment and then injecting the result into molds, in order to obtain what is called a "green body" bound by a polymer. This green body is then debound, for example by heating to 600° C., the binder polymer then being sublimated. The green body is finally sintered at a temperature close to the melting point of ceramic, thereby causing its densification and the obtaining of a solid part.

The level of pigment used varies depending on the desired color, but usually a few volume percents, typically about 3% to 5%, are sufficient for coloring ceramics. Indeed, during the sintering phase, the pigment is generally diffused into the ceramic which is white and which will therefore take on the color of the pigment.

However, when the pigment does not diffuse into the ceramic, the ceramic appears white, which reduces the strength of the added pigment. The colors thus obtained are generally pale and without much aesthetic interest.

In particular, there is no red pigment which can maintain its color after the sintering step. The colors obtained veer rather towards orange, burgundy, or brown.

The present invention is intended to offer new colored composite materials which significantly expand the range of possible colors.

SUMMARY OF THE DISCLOSURE

To this end, the invention relates to a solid composite material combining:
  an inorganic pigment in the form of discrete particles each comprising a colored core and a coating surrounding the core, said coating being adapted to allow light to pass through; and
  a matrix based on metalloid or metal oxide, said matrix being adapted to allow light to pass through.

With these arrangements, it is possible to obtain ceramic composite materials in a very wide range of colors, including ceramics that are bright red. A desired predetermined color can be obtained by mixing pigment particles having cores of different colors, for example red, green, blue, possibly black and white (or red, yellow, blue, possibly black and white). The matrix, which is adapted to allow light to pass through, in other words is transparent or translucent, allows the color of the pigment to diffuse to outside the material even if the pigment particle is located deep in the matrix. This has the effect of increasing the pigmentation surface area of the material and therefore increasing the intensity of its color.

Coating the pigment particles prevents interactions between the colored cores, particularly during sintering. Such interactions would render random results (particularly the final color). Coating the pigment particles makes it possible in particular to mix pigment particles having colored cores of different types, while preventing such interactions between cores. It is thus possible to obtain different colors according to the mixture chosen, while substantially maintaining the same method for producing the composite material regardless of the color selected.

In various embodiments of the composite material according to the invention, one or more of the following arrangements may advantageously be used:
  all the inorganic pigment particles have an identical coating;
  the inorganic pigment comprises a mixture of particles respectively having cores of at least two different types, in particular of different colors;
  the inorganic pigment represents a volume fraction comprised between 2% and 50% of said composite material;
  the core of at least one particle of the inorganic pigment is based on cobalt aluminate $CoAl_2O_4$;
  the core of at least one particle of the inorganic pigment is an oxide comprising at least one element selected from: iron, chromium, aluminum, titanium, silicon, zinc, nickel, cobalt, cadmium, copper, vanadium, bismuth, niobium, and manganese;
  the coating of at least one particle of the inorganic pigment is fabricated from a material selected from: mica, alumina, zirconia, and titanium dioxide;
  the particles of inorganic pigment have an average diameter comprised between 0.2 µm and 10 µm (or between 0.2 µm and 15 µm);
  the matrix is a ceramic, in that it is made of metal oxides;
  the matrix is based on magnesium aluminate spinel $MgAl_2O_4$;
  the matrix comprises a glass;
  the discrete particles of inorganic pigment form a mixture of several types of discrete particles respectively having colored cores of different colors.

The invention also relates to a method for producing a composite material as described above, said method comprising the following steps:
  a) selecting an inorganic pigment in the form of discrete particles each comprising a colored core and a coating surrounding the core, said coating being adapted to allow light to pass through;
  b) mixing the inorganic pigment in powder form with the matrix in powder form; and
  c) sintering said powder mixture.

In various embodiments of the method according to the invention, one or more of the following arrangements may advantageously be used:
- all the particles of the inorganic pigment have an identical coating;
- a composite material of given color is created, and during step a), the proportions of inorganic pigment particles selected from several predetermined types respectively having a plurality of basic colors are determined based on the given color, and the inorganic pigment particles are mixed in the defined proportions;
- said basic colors include red, green, and blue (or red, yellow, and blue);
- said basic colors further include black and white.

Finally, the invention further relates to a use of a composite material as defined above, in watchmaking or jewelry.

BRIEF DESCRIPTION OF DRAWINGS

The invention will be better understood by reading the following description of several of its embodiments, given as non-limiting examples with reference to the attached drawings, in which.

DETAILED DESCRIPTION OF THE DISCLOSURE

Figure 1:
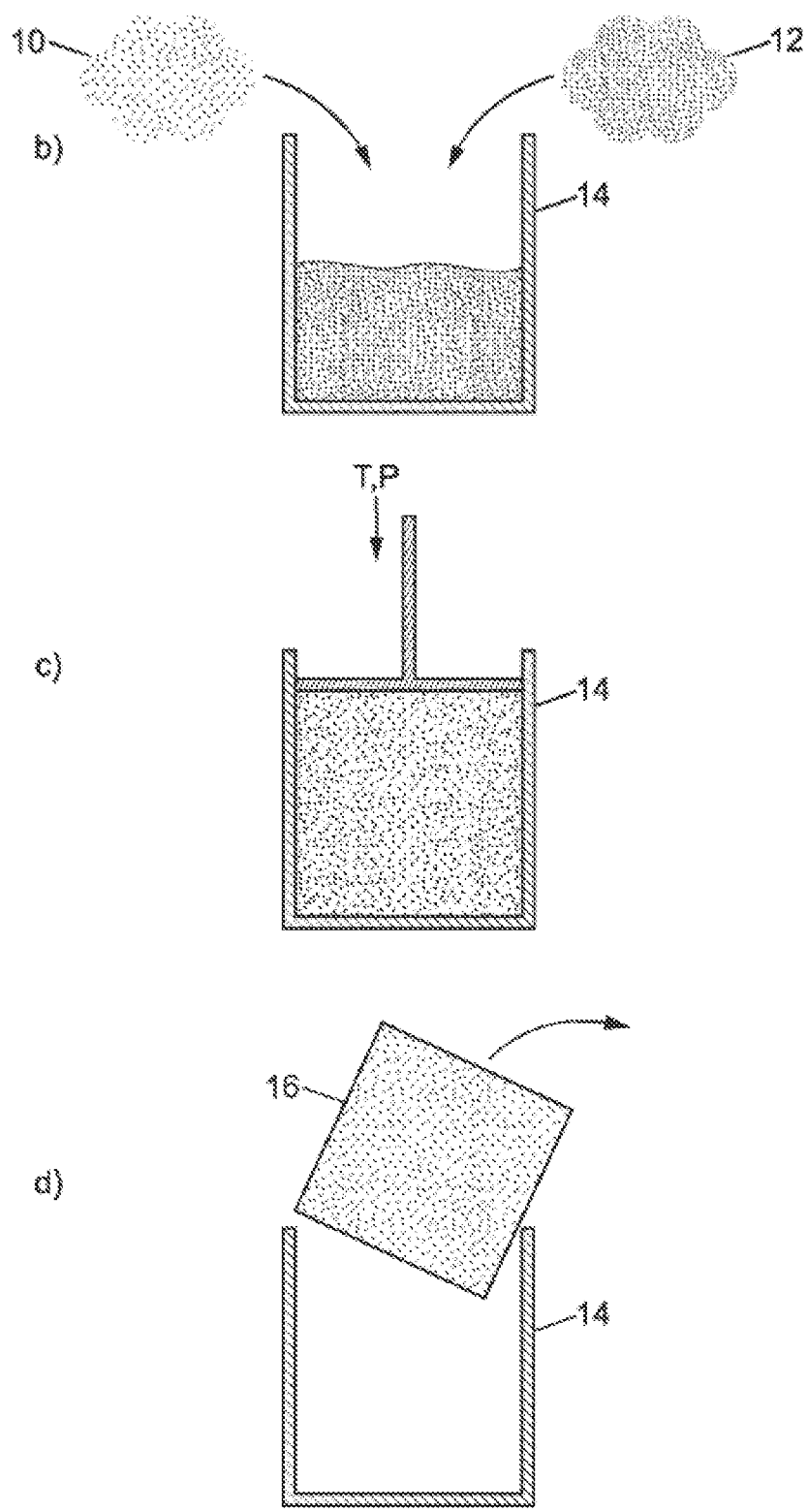
FIG. 1 is a schematic illustration of an exemplary method for producing a composite material according to one embodiment of the invention.

As explained above, the invention relates to a solid, sintered composite material for use particularly in watchmaking or jewelry, said material combining:
- an inorganic pigment; and
- a metalloid or metal oxide-based material, the matrix being adapted to allow light to pass through (in other words it is transparent or translucent).

The inorganic pigment may represent a volume fraction comprised between 2% and 50% of the composite material.

The inorganic pigment is in the form of discrete particles each comprising a colored core and a coating surrounding the core, said coating being adapted to allow light to pass through tin other words it is transparent or translucent).

The core of the inorganic pigment is selected according to the desired color to the composite material.

For blue and green, a core of an inorganic pigment based on aluminum and cobalt is selected, in particular cobalt aluminate $CoAl_2O_4$ having a spinel crystal structure. The blue or green color of the pigment and the color intensity of the pigment depend on its oxidation rate.

Apart from cobalt aluminate, it is also possible to use compounds having the following chemical formulas, the blue or green color and the color intensity also being dependent on the oxidation rate:
- $(Co,Zn)Al_2O_4$;
- $(Zn,Co)(Cr,Al)_2O_4$;
- $Co(Al,Cr)_2O_4$;
- $CoAl_2O_4/Co_2SnO_4$.

Depending on the color desired for the composite material, an element or combination of elements may be added in order to change the color of the compound. Among these elements are the following in particular: chromium, lithium, magnesium, silicon, strontium, tin, titanium, and zinc. Again, the blue or green color and the color intensity of the pigment depend on its oxidation rate.

For red and yellow, the colored core may be an oxide containing iron, chromium, aluminum, titanium, silicon, zinc, nickel, cobalt, cadmium, copper, vanadium, bismuth, and/or manganese. For example, these may be:
- $KAl_2(AlSi_3O_{10})(OH)_2$;
- $TiO_2$;
- $SiO_2$;
- $ZnO$.

Examples of red pigments with a titanium oxide and mica base are given in the following documents: U.S. Pat. Nos. 4,344,987 A, 5,522,923 A, and 4,066,100 A.

The coating of the inorganic pigment may be produced from a material selected from:
- mica, for example muscovite or biotite;
- alumina $Al_2O_3$;
- zirconia $ZrO_2$;
- titanium dioxide $TiO_2$.

The inorganic pigment particles may have an average diameter comprised between 0.2 μm and 10 μm.

Advantageously, the inorganic pigment degradation temperature is above 1300° C. This temperature corresponds to the decomposition temperature of the inorganic pigment which causes it to change color, or in other words the temperature an which the color of the inorganic pigment is altered.

The matrix is selected such that its densification temperature under pressure, at a pressure generally less than 250 MPa, is less than the degradation temperature of the inorganic pigment, thus advantageously less than 1300° C. One can thus sinter the material under pressure at a sintering temperature that is greater than or equal to the densification temperature at said pressure and less than said degradation temperature of the inorganic pigment.

The matrix is adapted to allow light to pass through, in other words it is transparent or translucent. For this purpose, the matrix is for example prepared according to known methods for transparent ceramics. The adaptation then lies in particular in the choice of oxide and in the forming conditions, in other words the densification temperature and the pressure.

As seen above, the matrix is based on metal oxide or metalloid oxide.

The concept of a metalloid refers to a chemical element that cannot be classified in the metals or in the non-metals, its physical and chemical properties being between those of a metal and a non-metal.

Metalloids are characterized by the following properties:
- their oxides are generally amphoteric (those of metals are more basic and those of non-metals are more acid);
- they behave like semiconductors (particularly boron, silicon, and germanium).

Metalloids thus form a diagonal band in the periodic table, between metals and non-metals:
- Boron $_5B$
- Silicon $_{14}Si$
- Germanium $_{32}Ge$
- Arsenic $_{33}As$
- Antimony $_{51}Sb$
- Tellurium $_{32}Te$
- Astatine $_{85}At$ In particular, the matrix may be a ceramic or may comprise silica, in particular a glass.

Found among the ceramic matrices usable in the context of the invention are: magnesium aluminate spinel ($MgAl_2O_4$), pure alumina or zirconia, mica, yttria-stabilized zirconia, and titanium dioxide.

Found among the matrices containing glass usable in the context of the invention are:
- silicates whose glass transition temperature is close to 600° C.;
- borosilicates, such as Pyrex®, whose glass transition temperature is 850° C.;
- glasses typically used in the production of enamels.

Figure 2:
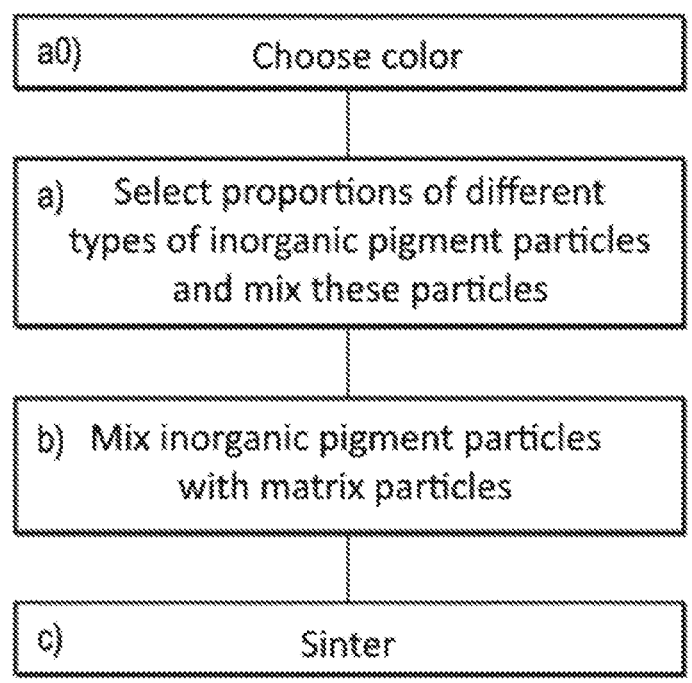
FIG. 2 is a time line for the method illustrated in FIG. 1.

A composite material according to the invention may be produced in particular by the method illustrated in FIGS. 1 and 2 and comprising the following steps:

aO) selecting the desired color,
a) selecting the proportions of the different types of inorganic pigment particles in order to obtain the desired color, and mixing these particles
b) mixing the inorganic pigment 10 in powder form with the matrix 12 in powder form, in a mold 14;
c) sintering the mixture of powders at a pressure sufficient for the densification temperature of the matrix 12 at this pressure to remain below the degradation temperature of the inorganic pigment 10, the sintering being done at a sintering temperature greater than or equal to the densification temperature at said pressure and less than said degradation temperature of the inorganic pigment;
d) removing the composite material 16 from the mold 14.

Thus, under pressure and heat, the inorganic pigment is stable while the matrix encapsulates all the inorganic pigment particles.

The sintering of the powder mixture is advantageously carried out at a pressure greater than 80 MPa.

Sintering can be achieved for example under uniaxial pressure using a SPS ("Spark Plasma Sintering") press where the increase in temperature can be achieved in a few minutes.

It is also possible to complete the sintering by sintering under isostatic pressure. This involves initially pressing the powder mixture to form pellets or injecting the components by a conventional ceramic injection technique, then performing a first sintering whose effect is to close the porosities without necessarily completing the process. Sintering is then completed in a furnace which can be pressurized by gas up to 200 MPa in general.

Example 1

A magnesium aluminate spinel powder ($MgAl_2O_4$) is used as a matrix, having a particle size of 0.2 μm with impurities of less than 10 ppm for Fe, Ca, Na, and less than 20 ppm for Si. One example is the powder produced by the Baikowski company under reference S30 CR.

The proportion of inorganic pigment may vary from 5% to 30% by volume.

Spinel $MgAl_2O_4$ is usually sintered at a temperature above 1800° C. In the invention, in order to preserve the inorganic pigment and maintain its intensity, the sintering is performed at about 1200° C., under very high isostatic or uniaxial pressure.

Densification of the spinel $MgAl_2O_4$ is possible within this temperature range, provided that the pressure is greater than 100 MPa.

In addition, this temperature range enables the use of a wide range of pigments without damage to them.

A dense composite ceramic material is thus obtained with a transparency that allows using the coloring of the inorganic pigment to a depth of several tens of millimeters, instead of having a color effect from only the pigment particles at the surface.

In particular, 32.76 g spinel $MgAl_2O_4$ (S30 CR Baikowski) is mixed with 4.6 g red pigment ($TiO_2$ coating on a $KAl_2(AlSi_3O_{10})(OH)_2$ core) to obtain a mixture with 10% pigment by volume. A graphite mold 30 mm in diameter is filled with 4 g of the mixture. The mixture is sintered under pressure for 5 min in an SPS press at 1200° C. with a force of 70 kN corresponding to a pressure of 100 MPa. This yields a dense ceramic disk that is bright red in color.

Example 2

Yttria-stabilized zirconia is used as a matrix. After sintering at 1200° C. at an isostatic or uniaxial pressure above 200 MPa, this can lead to obtaining a transparent or translucent zirconia.

By mixing up to 30% by volume of red pigment (for example the pigment of Example 1) with yttria-stabilized zirconia (up to 8% of added yttria), an effect similar to that obtained with glass or spinel $MgAl_2O_4$ is thus obtained, meaning a transparent matrix with red pigments trapped inside.

Due to its transparency/translucency, the matrix thus ensures a bright color of the final material and a maximum surface area of pigments reached by incoming and penetrating light.

The invention therefore provides new ceramic composite materials with a very wide range of colors.

In particular, in order to create a composite material of a given color, the selecting and mixing of step a) can be done using a limited number of predetermined types of inorganic pigment particles, the different types of particles respectively having cores of various base colors, in proportions suitable for obtaining said given color. This mixture of particles having cores of different types, without interaction between cores during sintering, is made possible by the fact that the core of each inorganic pigment particle is surrounded by a coating. It may be particularly advantageous if particles of different types have identical coatings.

With a relatively simple production facility, a very wide range of colors can thus be obtained. In particular, one can use three predetermined types of inorganic pigment particles whose cores respectively have three basic colors, red, green, and blue (or red, yellow, blue). Optionally, one can use five predetermined types of inorganic pigment particles whose cores respectively have five basic colors, red, green, blue, black, and white (or red, yellow, blue, black, and white). The latter two (black and white) make it possible to modulate the intensity, for example in order to obtain pastel colors.

The colored composite materials of the present invention have applications in the production, for example, of housing components for watchmaking, such as bezels, case middies, wristband fasteners, etc. The advantage of these materials in this application is their wear resistance and the guarantee that the color of the components cannot be damaged by stresses on the watch when worn on the wrist.

The invention claimed is:
1. A solid composite material comprising:
an inorganic pigment in the form of discrete particles each comprising a colored core and a coating surrounding the core, said coating being adapted to allow light to pass through; and
a matrix based on metalloid or metal oxide, said matrix being adapted to allow light to pass through, said matrix containing said discrete particles, said matrix being a sintered material selected from the group consisting of ceramic and glass, wherein the coating of the discrete particles is adapted to prevent interactions between the colored cores during sintering, wherein the inorganic pigment comprises a mixture of particles including a first type of particles each having a core of a first color and a second type of particles each having a core of a second color, and wherein the core of at least one particle of the inorganic pigment is based on cobalt aluminate CoAl2O4; wherein the particles of inorganic pigment have an average diameter comprised between 1.0 μm and 15 μm.

2. A solid composite material comprising:

an inorganic pigment in the form of discrete particles each comprising a colored core and a coating surrounding the core, said coating being adapted to allow light to pass through; and a matrix based on metalloid or metal oxide, said matrix being adapted to allow light to pass through, said matrix containing said discrete particles, said matrix being a sintered material selected from the group consisting of ceramic and glass, wherein the coating of the discrete particles is adapted to prevent interactions between the colored cores during sintering, wherein the inorganic pigment comprises a mixture of particles including a first type of particles each having a core of a first color and a second type of particles each having a core of a second color, and wherein the core of at least one particle of the inorganic pigment is an oxide comprising at least one element selected from the group consisting of: iron, chromium, aluminum, titanium, silicon, zinc, nickel, cobalt, cadmium, copper, vanadium, bismuth, niobium, and manganese; wherein the particles of inorganic pigment have an average diameter comprised between 1.0 μm and 15 μm.

* * * * *